Dec. 17, 1957  F. B. WOESTEMEYER  2,816,748
ACCELERATION RESPONSIVE DEVICE HAVING LIMITED RESPONSE
Filed Dec. 30, 1954
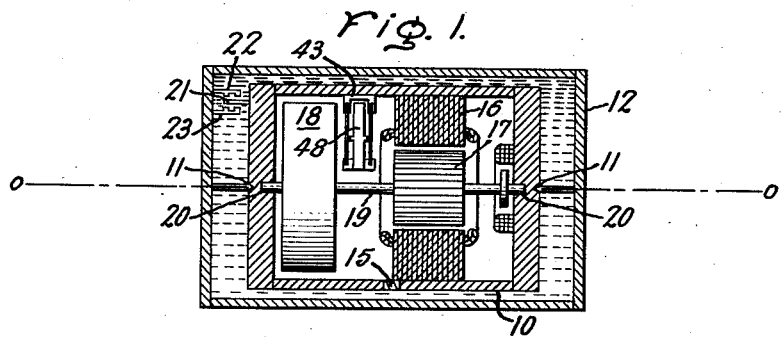
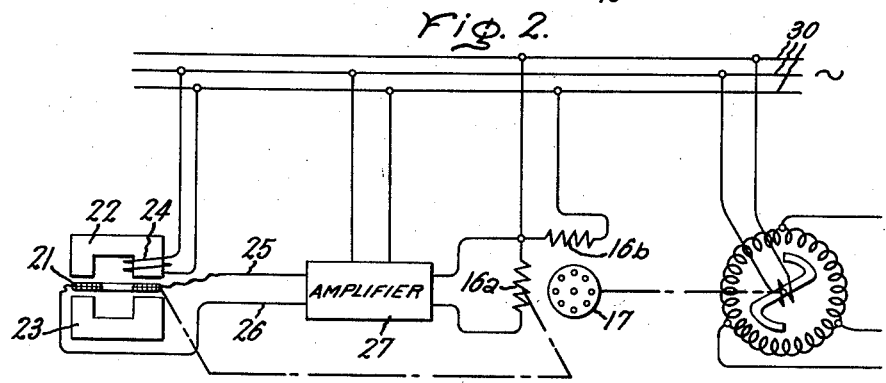
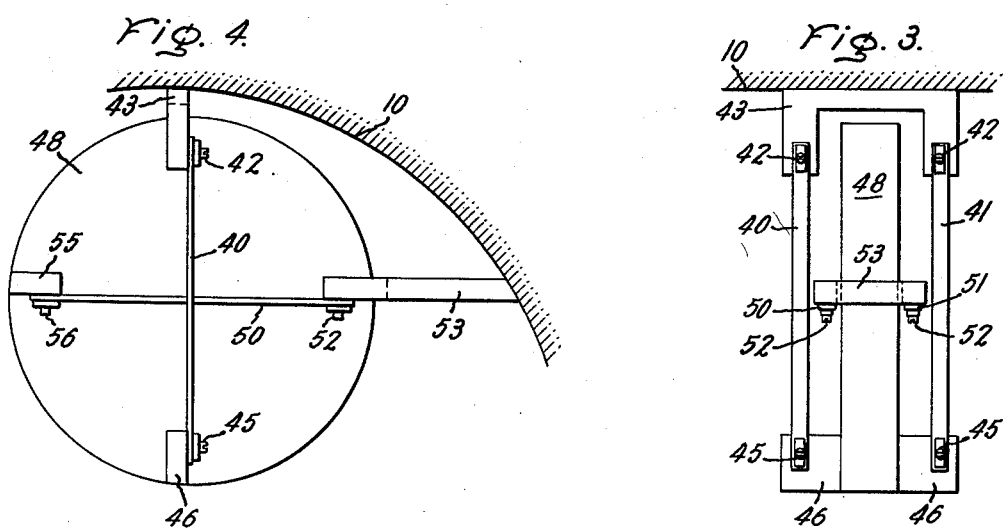
Inventor:
Francis B. Woestemeyer,
by
His Attorney.

United States Patent Office 2,816,748
Patented Dec. 17, 1957

2,816,748

ACCELERATION RESPONSIVE DEVICE HAVING LIMITED RESPONSE

Francis B. Woestemeyer, Schenectady, N. Y., assignor to General Electric Company, a corporation of New York Application December 30, 1954, Serial No. 478,601

5 Claims. (Cl. 264—1)

This invention relates to an acceleration responsive device of the type having an acceleration responsive element rotatably mounted therein and has for its object the provision of such a device having limited response in that the rotatably mounted element is rendered substantially insensitive to unwanted accelerations of a predetermined frequency.

The present invention constitutes an improvement on acceleration responsive devices of the type having the acceleration responsive element rotatably mounted. One device of this type is disclosed in a co-pending application of Frithiof V. Johnson, entitled "Acceleration Responsive Device," Serial No. 459,909, filed October 4, 1954, and assigned to the assignee of the present invention.

In the Johnson application referred to above, which is discussed here for illustrative purposes, there is disclosed an acceleration responsive device having an acceleration responsive element pivotally mounted for free rotation, and having an unbalanced mass eccentrically mounted on the acceleration responsive element so as to displace the center of gravity of the element from its axis of rotation and thereby unbalance the element whereby a torque is imparted to the unbalanced element in response to linear accelerations with resulting angular movement of the unbalanced element. Restoring means in the form of a servo system including an amplifier and a motor are provided responsive to this angular movement of the unbalanced element for imparting a counter torque thereto tending to restore the element to its original position. When devices of this type are mounted in vehicles, particularly guided missiles, they are, on occasion, subject to error caused by response of the acceleration responsive element to unwanted accelerations. These unwanted accelerations may be caused by oscillatory motions of the vehicle or by vibrations having frequencies outside the range of the accelerations which are desired to be measured. The forces produced by these accelerations can be damped out because they are generally of higher frequency than forces desired to be measured.

The acceleration responsive device is basically designed to respond to low frequency acceleration inputs. For its application it is not important that it respond to high frequency accelerations, such as are produced by vibrations of the vehicle body. Rather it is preferable that the device not respond to such accelerations since their presence can lead to some or all of the problems of increased heating of the servo system motor, increased power required for the servo loop amplifier, and saturation of the amplifier and consequent loss of accuracy.

Briefly stated in accordance with one aspect of this invention, there is provided an acceleration responsive device having an acceleration responsive element rotatably mounted, means for unbalancing the element whereby a torque is imparted thereto in response to accelerations, pickoff means for producing a signal in response to movement caused by this torque, and restoring means responsive to this signal for imparting a counter torque to the acceleration responsive element tending to restore it to its original position, said device further including a torsional spring and mass system arranged as a tuned damper for damping out forces caused by unwanted accelerations of a predetermined frequency and thereby rendering said acceleration responsive element insensitive to said forces.

The invention will be better understood and additional objects and advantages thereof will become apparent upon perusal of the following specification and claims taken in connection with the drawing, and the scope of the invention will be pointed out in the appended claims.

In the drawings, Figure 1 is a diagrammatic sectional view of the device illustrating one embodiment of this invention.

Figure 2 is a circuit diagram of the connections of the electrical components of the device shown in Figure 1.

Figure 3 is an enlarged fragmentary view of the damping system shown in Figure 1 with the bracket 53 shown detached from the container 10 for clarity.

Figure 4 is a side view of the damping system shown in Figure 1.

Referring more particularly to the drawings, an acceleration responsive device is provided having an acceleration responsive element rotatably mounted. As illustrated this element comprises a hollow container 10 pivotally mounted by bearing means 11 for rotation about an axis O—O. The bearing means 11 are mounted within a housing 12 which is fixed with respect to the member whose acceleration is to be measured.

Means are provided for unbalancing the acceleration responsive element whereby a torque is imparted thereto in response to acceleration desired to be measured. The illustrated form of this means is an unbalanced mass 15 mounted eccentrically in the container 10 and serving to make the center of gravity of the container 10 displaced from its axis of rotation.

Pickoff means are provided for producing a signal in response to rotation of the element caused by the torque described above. This pickoff means is in the form of a movable coil 21, which is fixed on the container 10 and moves with the container within the air gap of a closed magnetic circuit made up of magnetizable members 22 and 23 mounted on the inside of the housing 12 and energized by coil 24.

Restoring means are provided responsive to this signal for imparting a counter torque to the acceleration responsive element tending to restore it to its original position. This means in the illustrated embodiment is in the form of an electric motor mounted within the container 10, including a stator 16, a rotor 17, and a flywheel 18, mounted on the rotor shaft 19. The shaft 19 is mounted for rotation by bearing means in the form of journals 20 provided in the container 10. This restoring means also includes a circuit connecting the conductors 25 and 26 through an amplifier 27 to one phase 16a of the stator 16 of the two phase motor. The other phase 16b of the stator 16 is connected to a suitable A. C. power source 30 and the power for the amplifier 27 and for energizing the pickoff coil 24 is also obtained from the source 30. Flexible connectors, suitably insulated (not shown in Fig. 1) are used to transmit power and signals between the container 10 and the housing 12 in accordance with the circuit shown in Fig. 2. The signal is applied to the motor so that the rotation of the rotor and the flywheel will be in the same direction as the torque imparted to the container by the accelerations being measured, whereby the reaction torque on the stator will be in the opposite direction, acting to return the container to the original or null position.

A torsional spring and mass system for damping out unwanted forces caused by accelerations of a given frequency is provided thereby rendering the acceleration responsive element insensitive to such forces. In the illustrated embodiment such a torsional spring and mass system is in the form of a crossed-spring structure mounted within the acceleration responsive element and carrying a balanced inertia member.

A pair of leaf springs 40 and 41 are mounted as by cap screws 42 on a bracket 43 carried by the inner wall of the container 10 which in this example is the acceleration responsive element. At the opposite ends the springs 40 and 41 are secured as by cap screws 45 to projections 46 of a substantially circular disk 48 which in this illustrated embodiment is the balanced inertia member of the spring and mass damper system. Another pair of springs 50 and 51 are carried in a plane at right angles to the plane of the springs 40 and 41 to form a crossed-spring arrangement, one end of each of the springs 50 and 51 being mounted as by cap screws 52 to a bracket 53 which is carried in turn by the container 10. The other ends of the springs 50 and 51 are secured to projections 55 of the inertia disk 48 by cap screw 56. It will thus be seen that the inertia disk 48 is a mass mounted for limited oscillation and is restrained in both directions of oscillation. The natural frequency of oscillation of this spring-and-mass damper can be selected by ascertaining the ratio of inertia to spring rate. This natural frequency is preferably selected to be the same as the frequency of the unwanted acceleration. When the natural frequency of the spring-and-mass damper is the same as the frequency of the unwanted acceleration, it produces damping action and may be referred to as a tuned damper.

An additional advantage of the crossed-spring structure disclosed is that the center of gravity of the inertia mass is fixed with respect to the element 10 so that lateral accelerations do not change the balance of the acceleration responsive element. This feature is particularly important in highly sensitive accelerometers of the type contemplated.

It will be observed that in the preferred embodiment the axis about which the inertia disk of the damper oscillates is parallel to the pivot axis of the rotatably mounted acceleration responsive element. The damping system can be mounted anywhere within the acceleration responsive element so long as these axes are maintained substantially parallel.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What I claim as new and desire to secure by Letters Patent of the United States is:

1. An acceleration responsive device having an acceleration responsive element rotatably mounted, means for unbalancing said element whereby a torque is imparted thereto in response to accelerations desired to be measured, pickoff means for producing a signal in response to movement caused by said torque, restoring means responsive to said signal for imparting a counter torque to said element tending to restore it to its original position and reduce the amplitude of said signal, and a torsional spring-and-mass system supported by said element for damping out forces caused by unwanted accelerations of a predetermined frequency and thereby rendering said element substantially insensitive to said forces.

2. In an acceleration responsive device of the type having an acceleration responsive element mounted for free rotation therein, means for unbalancing said element whereby a torque is imparted thereto in response to accelerations desired to be measured, pickoff means for producing a signal in response to movement of the element caused by said torque, and restoring means responsive to said signal for imparting a counter torque to said element tending to restore it to its original position and reduce the amplitude of said signal, the improvement comprising a torsional spring-and-mass system mounted on the unbalanced element for damping out unwanted forces of a predetermined frequency and thereby preventing response of said element to said forces.

3. An acceleration responsive device comprising a housing, an acceleration responsive element rotatably mounted within said housing and having its center of gravity displaced from its axis of rotation to render it unbalanced whereby a torque is imparted to the element in response to acceleration, means for producing a voltage signal in response to movement caused by said torque, restoring means responsive to said signal for imparting a counter torque to said element tending to restore it to its original position and reduce the amplitude of said signal, and a torsional spring-and-mass system mounted on said unbalanced element for rendering said element substantially insensitive to unwanted forces of a predetermined frequency.

4. An acceleration responsive device as set forth in claim 3, said torsional spring-and-mass system comprising an inertia member mounted for oscillation in response to forces of a frequency desired to be eliminated and a spring structure for supporting said inertia member and restraining its oscillation in either direction.

5. An acceleration responsive device as set forth in claim 3, said torsional spring-and-mass system comprising a substantially circular disk-like inertia member, a cross-spring structure including at least two leaf springs lying in planes substantially at right angles to each other, each spring being secured at one end inside said unbalanced element and secured at its other end near the outer periphery of said inertia member, said system being so constructed and arranged as to damp out accelerations caused by unwanted forces of a predetermined frequency.

No references cited.